Nov. 11, 1952     A. E. DRISSNER     2,617,175
STOCK STOP

Filed Dec. 24, 1948     3 Sheets-Sheet 1

Inventor
Alfred E. Drissner
By Woodling and Krost
Attorney

Witness
Clyde H. Haynes

Nov. 11, 1952     A. E. DRISSNER     2,617,175
STOCK STOP

Filed Dec. 24, 1948     3 Sheets-Sheet 2

INVENTOR.
Alfred E. Drissner
BY Woodling and Kent
attys

Witness:
Clyde H. Haynes

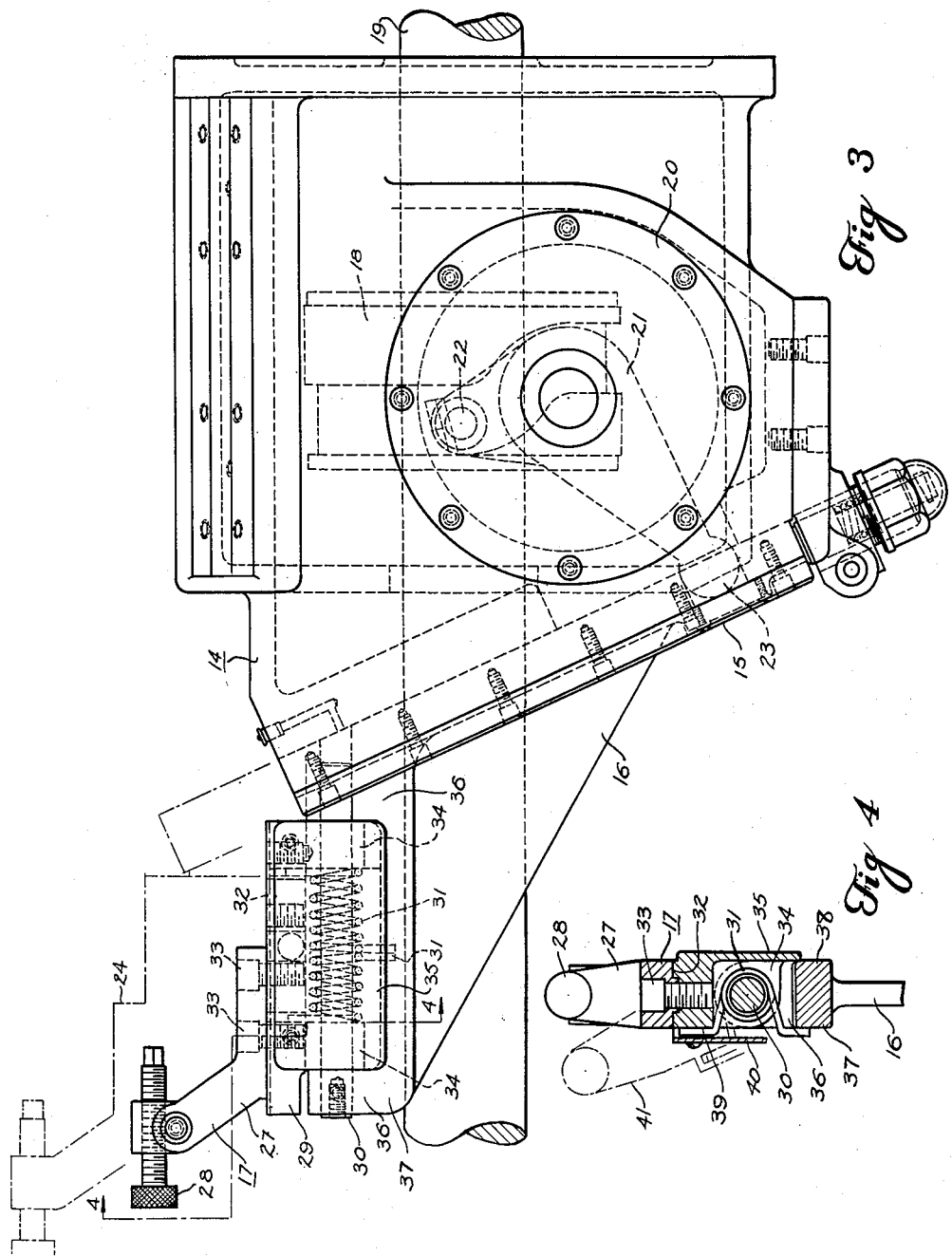

Patented Nov. 11, 1952

2,617,175

UNITED STATES PATENT OFFICE 2,617,175

STOCK STOP

Alfred E. Drissner, Cleveland, Ohio, assignor to The National Acme Company, a corporation of Ohio Application December 24, 1948, Serial No. 67,220

6 Claims. (Cl. 29—37)

My invention relates to an improvement in work or stock stop for machines having a work spindle through which a bar of stock is fed endwise, and particularly to the improvement wherein the stock stop can be moved sideways for the removal of butt ends from the spindle.

Prior to this invention operators found it necessary, when using an automatic spindle machine, to index the machine from a stock feeding position to an idle position, open the spindle chuck by hand, and remove the butt end before a new bar of stock could be inserted in the spindle and fed endwise against the stock stop. This operation required the operator's time and thus greatly reduced the efficiency of the automatic spindle machine. With my improvement in the stock stop, the stock stop mechanism can move up into position when stock is fed endwise out of the work spindle, but if a butt end is left in the collet or work spindle, the stock stop can be moved sideways to permit removal of the butt end of stock from the spindle. After the butt end has been removed, a new bar of stock may easily be inserted in the spindle and moved endwise against the stock stop. I have found that this invention not only saves time but is more convenient and easier for an operator to control on any multiple spindle machine.

When the machine indexes and the collet opens, the stock stop is in the upper position, in line with the spindle. On previous machines the spindle carrier had to be indexed into an open position to remove the butt ends. This position is generally what is called the No. 1 position, where the chuck or collet can be opened by hand; but when making the stock stop so it can be moved sideways to remove the butt ends in the chucking position, it not only saves time in the indexing of the machine to another position, but also keeps the collet open to insert the new bar and close the collet by power. Especially on fast running jobs, this time saving is very important. Otherwise, the operator would have to make a full cycle of the spindle carrier after removing the butt ends in the first position to insert the new bar in the chucking position.

With my invention the operator does not have to index the machine from the stock feeding position to an idle position, open the chuck or collect by hand, and remove the butt end before a new bar stock can be inserted in the collet and moved against the stock stop. The operator simply moves the stock stop sideways so that he may remove the butt end and insert a new bar in the collet, thus saving much time and work for the operator. This improvement in the stock stop is simple in construction and very effective in operating an automatic spindle machine at low cost where the work is of any length within the capacity of the machine.

My invention therefore has for one of its objects the provision of a stock stop mechanism which is moveable toward and away from the spindle or collet in a plane of movement and which has a stock stop pivotally carried for movement sideways or transversely of the plane of movement of the carrier.

Another object of my invention is to provide an inclining stock stop which may be moved sideways out of alignment of the chucking spindle when a butt end has to be removed from the spindle.

Another object of my invention is to provide an improvement on a moveable stock stop mechanism which is simple in construction and saves much time in operating the machine.

Other objects and a fuller understanding of the invention may be had by referring to the following description and claims, taken in conjunction with the accompanying drawings, in which:

Figure 3 is a side view of the stock stop mechanism illustrating the movement of the stock stop in phantom lines; and Figure 4 is a sectional view along the line 4—4 of Figure 3.

Figure 1:
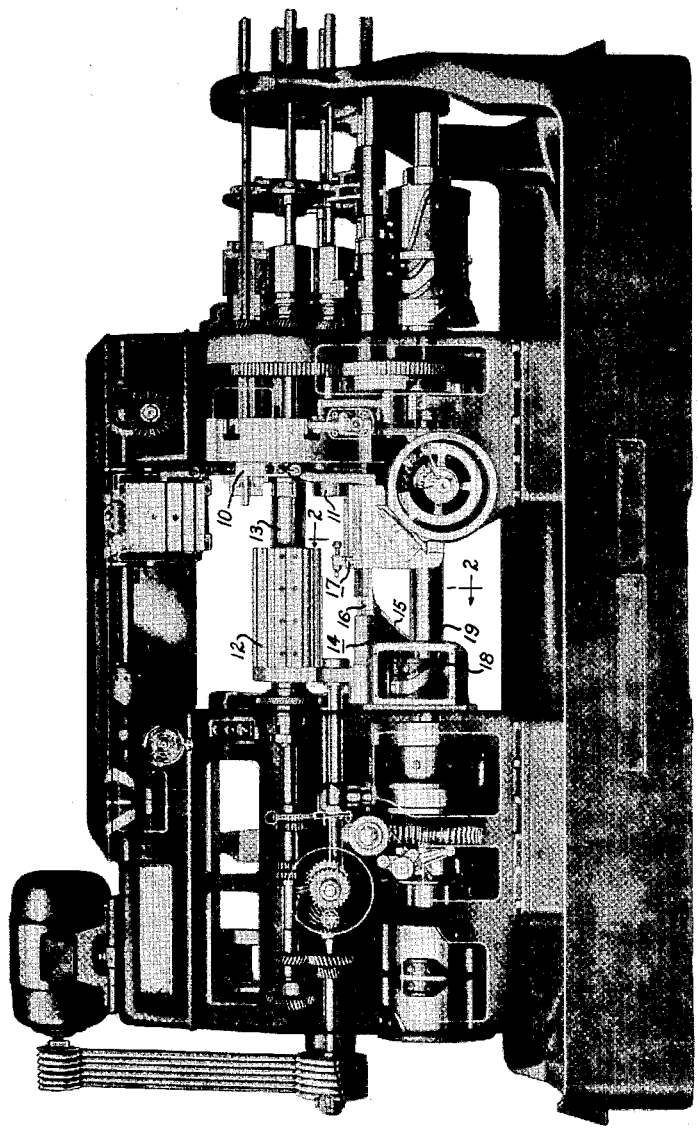
Figure 1 is a picture view of the multiple spindle machine with the working parts thereof superimposed thereon and illustrating the position of the stock stop in its relation to the work spindle.

My stock stop mechanism is illustrated in the Figure 1 as applied to a large automatic spindle machine. This large automatic spindle machine comprises a rotatable spindle carrier 10 having work supporting spindles 11 and a sliding tool carrier 12 mounted on a shaft 13. The machine also has a guide bracket 14 which supports the stock stop mechanism in transversely inclined planes for up and down movement and simultaneously for movement in the axial plane of the work spindle toward and away from the said work spindle 11. The guide bracket 14 has a front face 15 which carries slidably a stock stop carrier member 16. A stock bumper or work piece stop engaging member 17 is pivotally mounted on this carrier member 16.

Figure 2:
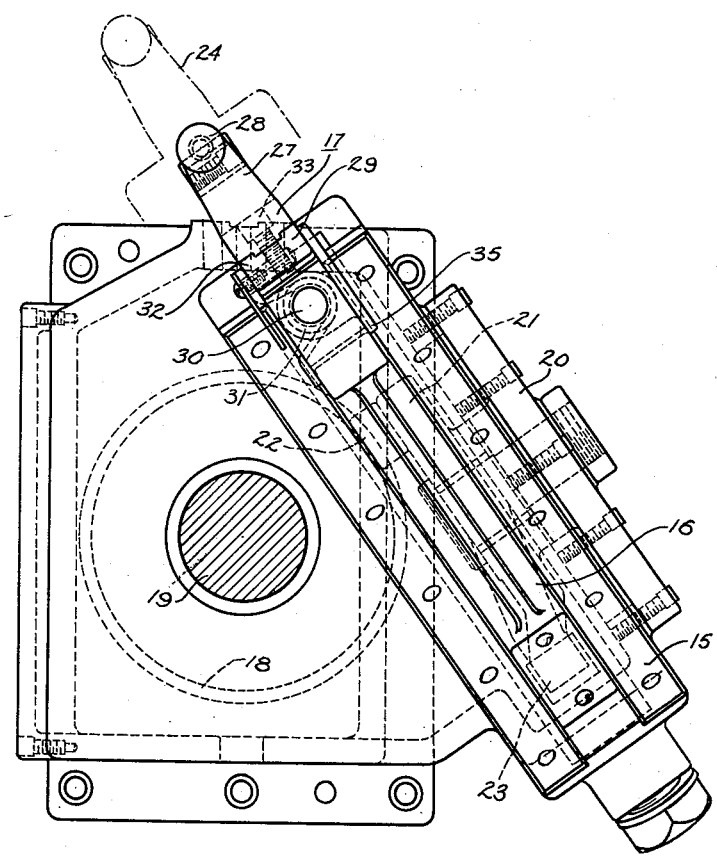
Figure 2 is an end view of the stock stop taken on the line 2—2 of Figure 1.

The carrier member 16 is reciprocally moved on the inclined front face 15, which is directed towards the axis of the work spindle 11 and at an angle thereto, by a cam drum 18 mounted on a drive shaft 19. I have provided the guide bracket 14 with a cover plate 20 on the side thereof, as shown in Figures 2 and 3. A crank arm 21 is pivotally mounted on this cover plate 20 and has a cam engaging portion 22 engaging the cam drum 18 and a carrier member engaging end 23 engaging the carrier member 16. The carrier member engaging end 23 is socketed in the carrier member 16 so that movement of the crank arm 21 by the cam drum 18 reciprocates the carrier member 16 on the front face 15 of the guide bracket 14. During the tool operations and the indexing of the spindle carrier, the stock stop mechanism is located in an inoperable position entirely out of the way of the operating parts of the machine and below the tool carrier. This position is indicated by the solid lines of Figures 2 and 3. At the time the stock feeding takes place the cam drum 18 rotates, thus pivoting the crank arm 21 to move the stock stop carrier member 16 on the front face 15 into the position as indicated by the phantom lines 24. This line of movement is at a plurality of angles to the machine and in transversely inclined planes upwardly and simultaneously in an axial plane in the work spindle towards said spindle. When the stock stop mechanism has been moved upwardly and into the position indicated by the phantom lines 24 in Figures 2 and 3, the stock stop engagement member or bumper 17 is axially aligned with a work supporting spindle 11 so that the stock stop will engage the work or stock bar being fed through the work supporting spindle 11 thereby properly positioning the stock for the tooling operations. After the stock has been properly positioned in the machine, the continued rotations of the cam drum 18 moves the crank arm 21 to return the stock stop mechanism to its inoperable position below the carrier.

I have discovered that by pivotally mounting the stop engagement bumper 17 on the carrier member 16, the operator can easily move the stop engagement bumper 17 sideways of the machine and out of axial alignment with the work supporting spindle while the carrier is in the operative position and without indexing the machine to an idling position. This saves much time and work in that the operator can remove butt ends before the new bar stock is inserted in the work supporting spindle 11 without opening the chuck by hand and indexing the machine. When the machine is in the stock feeding position the stock stop mechanism is in alignment to stop endwise movement of the work piece or bar stock through the work supporting spindle, and the chucks in the spindle are opened.

The stop engagement bumper 17, comprising a swinging arm 27 carried by a housing 29, is pivotally held on carrier member 16 by a pilot shaft 30. The carrier member 16, as is best illustrated in Figures 3 and 4, has spaced pilot shaft supporting arms 36 with aligned openings therein for receiving and supporting the pilot shaft 30. The housing 29 also has end bearing portions 34, one on each end thereof, with openings therein through which the pilot shaft extends. These bearing portions 34 of the housing 29 are between the pilot shaft supporting arms 36 so that the housing 29 is hinged or pivotally and swingably mounted on the carrier member 16.

Springs 31 encircling this pilot shaft and having the ends thereof engaging the housing 29 and the carrier member 16 normally hold the swinging arm 27 in proper alignment so that it will be axially aligned with the work supporting spindle 11 when the stock stop mechanism is moved into the upward or operative position. I have designated the swinging arm 16 as having a front surface 37 and a back surface 38. The housing 29 has a stop plate 35 on the back side thereof to engage the back surface 38, and a front spring engaging surface 39. One end of the spring 31 engages the front surface 37 of the carrier member 16 and the other end of the spring 31 engages the front spring engaging surface 39 of the housing 29. A plate 40 may be bolted to the front spring engaging surface 39 of the housing 29 to hold the end of the spring thereagainst. The resiliency of the spring urges the housing 29 and thus the stop engagement bumper 17 in an upright position in alignment with the carrier member 16. The stop plate 35 rests against the back surface 38 to hold the swinging arm in the plane of the carrier member 16. The operator can easily move the swinging arm 17 pivotally sideways of the carrier member 16, as indicated by the phantom lines 41 of Figure 4. This sideways movement of the swinging arm 17 against the restraining forces of the spring 31, thus moves it out of axial alignment with the work supporting spindle 11 while the carrier member 16 is in its operating position, as indicated by the phantom lines 24 in Figure 3, and without indexing the machine to an idling position. Although I have illustrated the use of two springs 31 in my drawings and have found that this number of springs is preferable, it is understood that any number of springs 31 may be used.

The housing 29 has a grooved top 32 and the swinging arm 27 has a grooved bottom cooperating therewith. Bolts 33 extending through the swinging arm 27 and threaded into bolt holes in the grooved top 32 securely hold the swinging arm on the housing 29. As is illustrated in Figure 4 of my drawings the housing 29 may be provided with a plurality of bolt holes for receiving these bolts 33, thus providing an adjustable positioning of the swinging arm 27 on the housing 29. I have also provided the swinging arm 27 with an adjustment bumper bolt 28 which is bumped by the bar of stock as it is moved endwise through the work supporting spindle. After fastening the swinging arm in the correct position on the housing 29, this bumper bolt 28 may be threaded in or out of the swinging arm 27 to provide an adjustment whereby the stock is properly positioned for the tooling operations.

When operating the machine with my device, the operator does not have to index the machine from a stock feeding position to an idle position, open the chuck or collet by hand and remove the butt end before a new bar stock can be inserted in the collet and moved against the stock stop. The machine through the cam drum 18 moves the carrier member 16 upwardly in a line of movement into the position indicated by the phantom lines 24 and in axial alignment with the spindle 11. If there is a butt end in the spindle 11, the operator simply moves the stop engagement member or bumper 17 sideways so that he may remove the butt end and inserts a new bar in the work supporting spindle 11. The springs 31 normally hold the swinging arm 17 in proper alignment with the carrier member 16. This improvement in the stock stop, thus saves much time and work for the operator and is very effective in holding down operating costs of an automatic spidle machine to a minimum.

Although the invention has been described in

What is claimed is:

1. In a stock stop mechanism for a multiple spindle machine having a plurality of spindles through which stock may be fed endwise and axially, a carrier member mounted for reciprocal movement in a combined radial and axial direction relative to one of said spindles, a pilot shaft on said carrier member, a housing bearingly mounted on said pilot shaft for pivotal movement in a sidewise direction generally transverse to the direction of movement of the carrier member, at least a spring encircling said shaft and interengaging said housing and said carrier member and restraining pivotal movement of said housing, and a stock bumper secured to said housing and carried thereby.

2. In a stock stop mechanism for a multiple spindle machine having a plurality of spindles through which stock may be fed endwise and axially, a carrier member mounted for reciprocal movement in a combined radial and axial direction relative to one of said spindles, a pilot shaft on said carrier member, a housing bearingly mounted on said pilot shaft for pivotal movement in a sidewise direction generally transverse to the direction of movement of the carrier member, said housing having a plate portion abuttable against said carrier member, at least a spring encircling said shaft and interengaging said housing and said carrier member and restraining pivotal movement of said housing and simultaneously urging said plate portion against said carrier member, and a stock bumper carried by said housing.

3. In a stock stop mechanism for a multiple spindle machine having a plurality of spindles through which stock may be fed endwise and axially, a carrier member mounted for reciprocal movement in a combined radial and axial direction relative to one of said spindles, a pilot shaft on said carrier member, a housing bearingly mounted on said pilot shaft for pivotal movement in a sidewise direction generally transverse to the direction of movement of the carrier member, means interengaging said housing and said carrier member and restraining pivotal movement of said housing, and a stock bumper secured to said housing and carried thereby.

4. In a stop mechanism for a multiple spindle machine having a plurality of spindles through which stock may be fed endwise and axially, a carrier member mounted for reciprocal movement in a combined radial and axial direction relative to one of said spindles, a pilot shaft on said carrier member, a housing bearingly mounted on said pilot shaft for pivotal movement in a sidewise direction generally transverse to the direction of movement of the carrier member, said housing having an alignment portion abuttable against said carrier member, means interengaging said housing and said carrier member and restraining pivotal movement of said housing and simultaneously urging said alignment portion against said carrier member, and an adjustable stock bumper secured to said housing and carried thereby.

5. In a stock stop mechanism for a machine tool having a spindle through which stock may be fed endwise and axially, a carrier member mounted for reciprocal movement in a combined radial and axial direction relative to said spindle, bearing means on said carrier member having an axis generally parallel to the axis of said spindle and transverse to the path of movement of said carrier member, a housing journaled in said bearing means, means interengaging said housing and said carrier means and restraining pivotal movement of said housing, and a stock bumper mounted on said housing.

6. In a stock stop mechanism for a machine tool having a spindle through which stock may be fed endwise and axially, a carrier member mounted for reciprocal movement in a combined radial and axial direction relative to said spindle, a pilot shaft on said carrier member, a housing bearingly mounted on said pilot shaft for pivotal movement in a sidewise direction generally transverse to the direction of movement of the carrier member, means interengaging said housing and said carrier member and restraining pivotal movement of said housing and a stock bumper secured to said housing and carried thereby.

ALFRED E. DRISSNER.

REFERENCES CITED

The following references are of record in the file of this patent:

UNITED STATES PATENTS

| Number | Name | Date |
| --- | --- | --- |
| 672,742 | Potter et al. | Apr. 23, 1901 |
| 2,055,435 | Gridley et al. | Sept. 22, 1936 |
| 2,095,399 | Rupple | Oct. 12, 1937 |
| 2,118,014 | Montgomery et al. | May 17, 1938 |
| 2,170,633 | Drissner | Aug. 22, 1939 |
| 2,192,198 | Montgomery et al. | Mar. 5, 1940 |
| 2,534,993 | Robichand | Dec. 18, 1950 |